(12) United States Patent
Li et al.

(10) Patent No.: US 10,963,269 B2
(45) Date of Patent: Mar. 30, 2021

(54) APPARATUS, METHOD, AND PROGRAM PRODUCT FOR STORING A HARDWARE MANIFEST

(71) Applicant: LENOVO (Singapore) PTE. LTD., New Tech Park (SG)

(72) Inventors: Scott Wentao Li, Cary, NC (US); Russell Speight VanBlon, Raleigh, NC (US); Robert James Kapinos, Durham, NC (US); Robert James Norton, Jr., Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 131 days.

(21) Appl. No.: 16/368,646

(22) Filed: Mar. 28, 2019

(65) Prior Publication Data
US 2020/0310831 A1 Oct. 1, 2020

(51) Int. Cl.
| | | |
|---|---|---|
| G06F 9/445 | (2018.01) | |
| G06F 21/57 | (2013.01) | |
| G06F 16/93 | (2019.01) | |
| G06F 8/658 | (2018.01) | |
| G06F 12/06 | (2006.01) | |
| G06F 8/65 | (2018.01) | |

(52) U.S. Cl.
CPC .......... *G06F 9/44505* (2013.01); *G06F 16/93* (2019.01); *G06F 21/57* (2013.01); *G06F 8/65* (2013.01); *G06F 8/658* (2018.02); *G06F 12/0692* (2013.01); *G06F 2212/402* (2013.01); *G06F 2221/2107* (2013.01)

(58) Field of Classification Search
CPC .......... G06F 12/0692; G06F 2212/402; G06F 2221/2107; G06F 8/65; G06F 8/658; G06F 9/44505; G06F 16/93; G06F 21/57
See application file for complete search history.

(56) References Cited

U.S. PATENT DOCUMENTS

| 2003/0097579 A1* | 5/2003 | England | G06F 21/57 713/193 |
| 2006/0195208 A1* | 8/2006 | Sammer | G06F 11/006 700/97 |
| 2016/0103669 A1* | 4/2016 | Gamage | H04L 67/34 717/177 |
| 2017/0024570 A1* | 1/2017 | Pappachan | G06F 21/602 |
| 2018/0150372 A1* | 5/2018 | Nachimuthu | H04L 41/044 |

* cited by examiner

*Primary Examiner* — Terrell S Johnson
(74) *Attorney, Agent, or Firm* — Kunzler Bean & Adamson

(57) ABSTRACT

Apparatus, methods, and program products are disclosed for storing a hardware manifest. One apparatus includes a processor and a memory that stores code executable by the processor. The code is executable by the processor to store a hardware manifest for an information handling device. The code is further executable by the processor to manage modification of the hardware manifest. Methods and computer program products that perform the functions of the apparatus are also disclosed.

20 Claims, 10 Drawing Sheets

APPARATUS, METHOD, AND PROGRAM PRODUCT FOR STORING A HARDWARE MANIFEST

FIELD

The subject matter disclosed herein relates to computing systems and/or devices and more particularly relates to storing a hardware manifest.

DESCRIPTION OF THE RELATED ART

Computing systems and/or information handling devices, such as desktop computers, laptop computers, tablet computers, smart phones, optical head-mounted display units, smart watches, smart devices, voice-controlled electronic devices, televisions, streaming devices, etc., are ubiquitous in society. Typically, computing systems and information handling devices include one or more pieces of hardware and/or parts. At times, one or more pieces of hardware and/or parts in a computing systems or information handling device are replaced and/or repaired. Without closely inspecting conventional computing systems and/or information handling devices, it can be difficult to determine whether a particular computing system and/or information handling device has been modified and/or is in its original state.

BRIEF SUMMARY

An apparatus for storing a hardware manifest is disclosed. A method and computer program product also perform the functions of the apparatus. In one embodiment, the apparatus includes a processor and a memory that stores code executable by the processor. The code, in various embodiments, is executable by the processor to store a hardware manifest for an information handling device. The code, in certain embodiments, is executable by the processor to manage modification of the hardware manifest.

In some embodiments, the information handling device comprises a set of hardware. In additional or alternative embodiments, the hardware manifest includes a unique signature for at least one piece of hardware in the set of hardware. In further additional or alternative embodiments, the unique signature includes a serial number, a firmware hash, and/or a version identifier.

In various embodiments, managing modification of the hardware manifest includes protecting the hardware manifest from modification by an external entity. In some embodiments, protecting the hardware manifest from modification includes encrypting the hardware manifest and/or password-protecting the hardware manifest. In additional or alternative embodiments, the hardware manifest is written and/or stored in a read only format and/or the memory is a read-only memory device.

In further embodiments, the information handling device includes a set of hardware and managing modification of the hardware manifest includes updating the hardware manifest each time each piece of hardware in the set of hardware is modified. In some embodiments, modification of a piece of hardware in the set of hardware includes replacing the piece of hardware. In additional or alternative embodiments, modification of a piece of hardware includes repairing the piece of hardware. In further additional or alternative embodiments, managing modification of the hardware manifest includes maintaining a log in the hardware manifest. In still further additional or alternative embodiments, updating the hardware manifest includes tracking, in the log, each time each piece of hardware is modified.

A method, in one embodiment, includes storing, by a processor, a hardware manifest for an information handling device. The method further includes the processor managing modification of the hardware manifest.

In one embodiment, a program product includes a computer-readable storage medium that stores code executable by a processor. The executable code, in certain embodiments, includes code to perform storing, by a processor, a hardware manifest for an information handling device. The executable code, in various embodiments, further includes code to perform managing modification of the hardware manifest.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
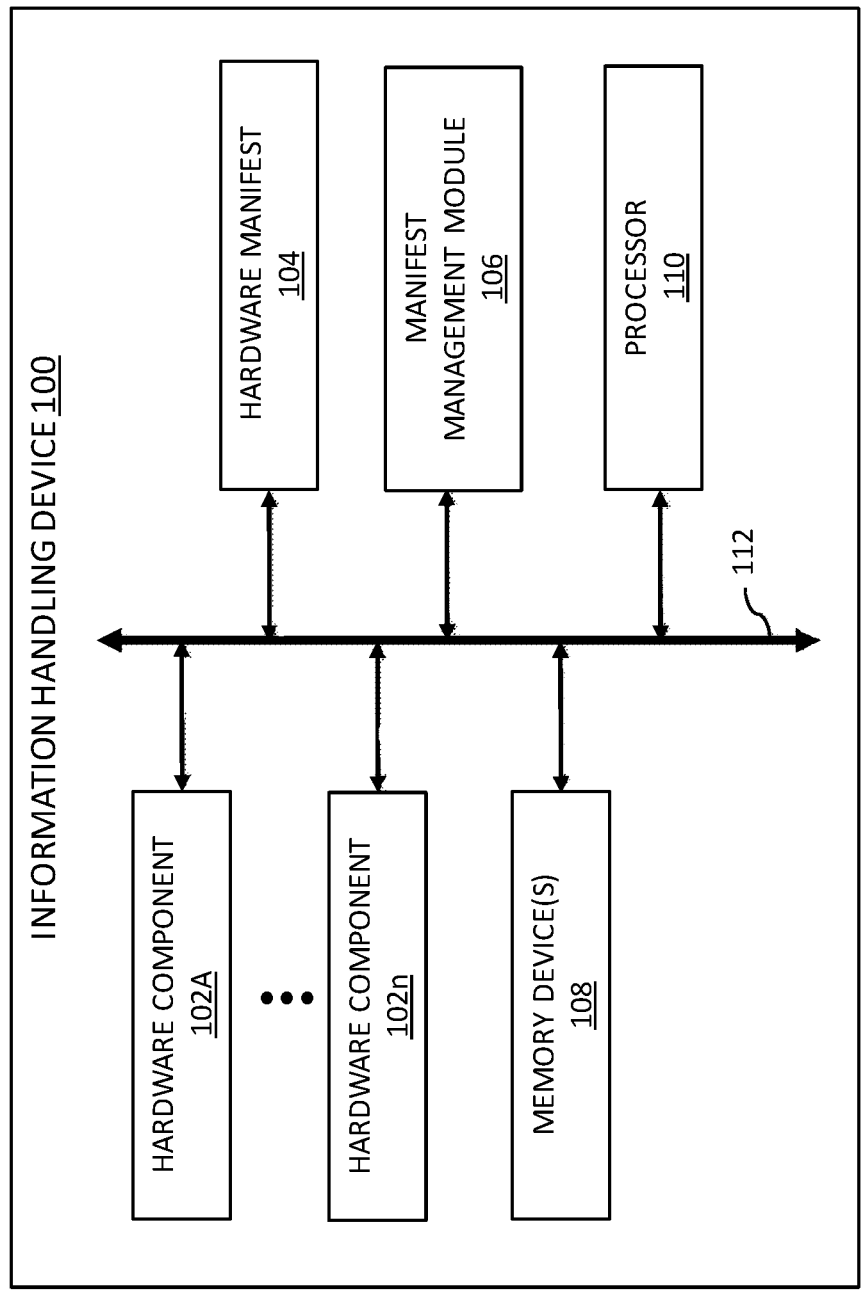
FIG. 1 is a schematic block diagram illustrating one embodiment of an information handling device.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code that may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable medium may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms a, an, and the also refer to one or more unless expressly specified otherwise.

In addition, as used herein, the term set can mean one or more, unless expressly specified otherwise. The term sets can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram of one embodiment of an information handling device 100. An information handling device 100 may include any suitable computing device that is known or developed in the future. In various embodiments, the information handling device 100 can include a desktop computer, a laptop computer, a personal digital assistant (PDA), a tablet computer, a smart phone, a cellular telephone, a smart television (e.g., televisions connected to the Internet), a set-top box, a game console, a vehicle on-board computer, a streaming device, a smart device, and a digital assistant, etc., among other computing devices that are possible and contemplated herein. In some embodiments, an information handling device 100 can include a wearable device, such as a smart watch, a fitness band, or an optical head-mounted display, etc., among other wearable devices that are possible and contemplated herein.

At least in the illustrated embodiment, an information handling device 100 includes, among other components, a set of hardware components 102A through 102n (also simply referred individually, in various groups, or collectively as hardware component(s) 102), a hardware manifest 104, a manifest management module 106, a set of memory devices 108, and a processor 110 coupled to and/or in communication with one another via a bus 112 (e.g., a wired and/or wireless bus 112).

A hardware component 102 may include any suitable piece of computing hardware and/or peripheral that is known or developed in the future. The information handling device 100 may include any suitable quantity of hardware components 102 that enables the information handling device 100 to perform general computing functions and/or specialized computing functions. Further, the information handling device 100 may include any suitable quantity of hardware components 102 that enables the information handling device 100 to execute generalized computing code, specialized computing code, one or more general applications and/or one or more specialized applications.

Computing hardware can include one or more physical parts (e.g., parts that can be physically touched) of an information handling device 100. Examples of computing hardware include, but are not limited to, a case/cabinet, a CPU, a graphics processing unit (GPU), a display/monitor, a keyboard, a mouse, a touchpad, a joystick, a microphone, a camera, a button, a disk drive (e.g., a hard disk drive (HDD), a digital versatile disk (DVD) drive, a compact disk (CD) drive), a motherboard, a graphics card, a video card, a sound card, an expansion card, one or more speakers, a power supply, one or more display components in a virtual reality (VR) system, one or more display components in an augmented reality (AR) system, a clock, a memory device 108, a processor 110, and/or a bus 112, etc., among other computing hardware that are possible and contemplated herein.

A peripheral can include any suitable computing peripheral that is known or developed in the future. Examples of a peripheral include, but are not limited to, removable media (e.g., a USB flash drive, a optical drive, a tape drive, etc.), a display/monitor, a keyboard, a mouse, a touchpad, a joystick, one or more speakers, a printer, a graphics tablet, a memory card, an image scanner, a barcode reader, a game controller, a light pen and/or gun, a microphone, a camera, a webcam, an external power source, a dance pad, a projector, headphones, etc., among other computing peripherals that are possible and contemplated herein.

A hardware manifest 104 may include any suitable hardware and/or software that can store, track, list, record, identify, and/or otherwise memorialize the set of hardware components 102 included in the information handling device 100. In some embodiments, the hardware manifest 104 includes a listing of and/or tracks all of the hardware components 102 included in the information handling device 100. In other embodiments, the hardware manifest 104 includes a listing of and/or tracks a subset of the hardware components 102 included in the information handling device 100. In still other embodiments, the hardware manifest 104 includes a listing of and/or tracks one or more of the hardware components 102 included in the information handling device 100. In yet other embodiments, the hardware manifest 104 includes a listing of and/or tracks a single hardware component 102 included in the information handling device 100.

Which hardware component(s) 102 to include and/or track in the hardware manifest 104 can be based on any suitable criteria or criterion. For example, a hardware component can be included and/or tracked based on the monetary value of the hardware component 104, quantity of sales, returns, and/or exchanges of the hardware component 104, ease and/or difficultly of accessing the hardware component 104, ease and/or difficultly of detecting unauthorized access to the hardware component 104, ease and/or difficultly of replacing the hardware component 104, ease and/or difficultly of detecting unauthorized replacement of the hardware component 104, ease and/or difficultly of repairing the hardware component 104, ease and/or difficultly of detecting unauthorized repair of the hardware component 104, ease and/or difficultly of breaking the hardware component 104, ease and/or difficultly of detecting breakage of the hardware component 104, ease and/or difficultly of counterfeiting the hardware component 104, ease and/or difficultly of detecting a counterfeit of the hardware component 104, and/or the usefulness/importance to the functionality of the information handling device 100, etc., among other criteria that are possible and contemplated herein.

Figure 2:
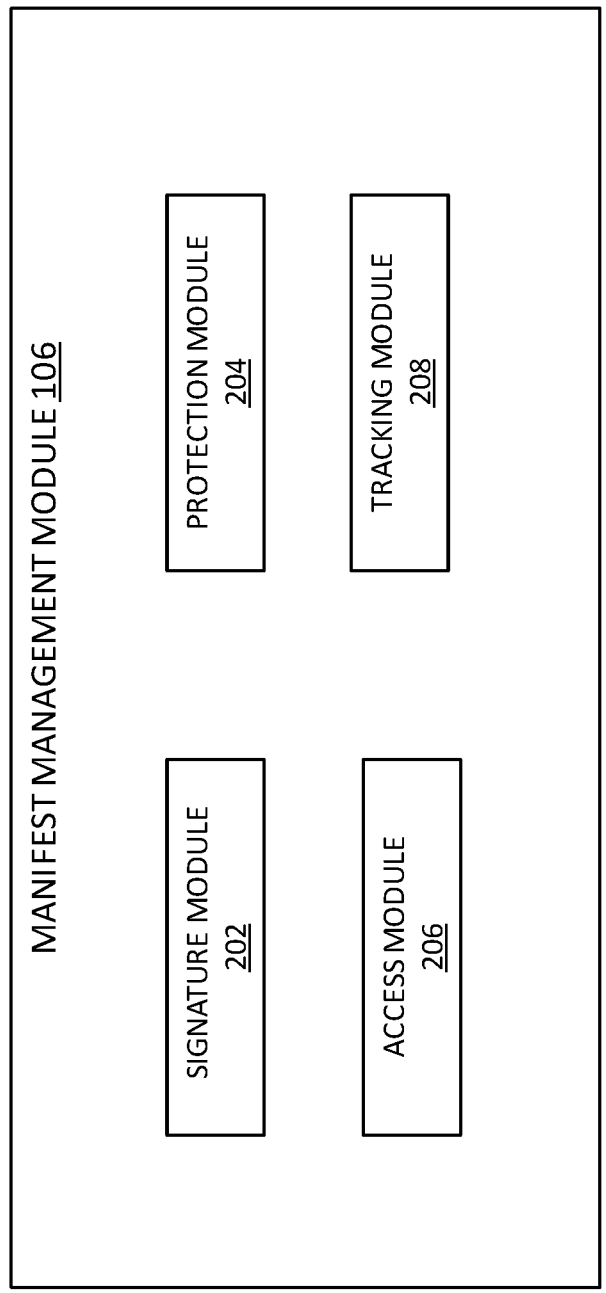
FIG. 2 is a schematic block diagram illustrating one embodiment of a manifest management module included in the information handling device of FIG. 1.

A manifest management module 106 may include any suitable hardware and/or software than can manage one or more contents and/or functions of the hardware manifest 104. With reference to FIG. 2, FIG. 2 is a block diagram of one embodiment of a manifest management module 106. At least in the illustrated embodiment, the manifest management module 106 includes, among other components, a signature module 202, a protection module 204, an access module 206, and a tracking module 208.

Figure 3:
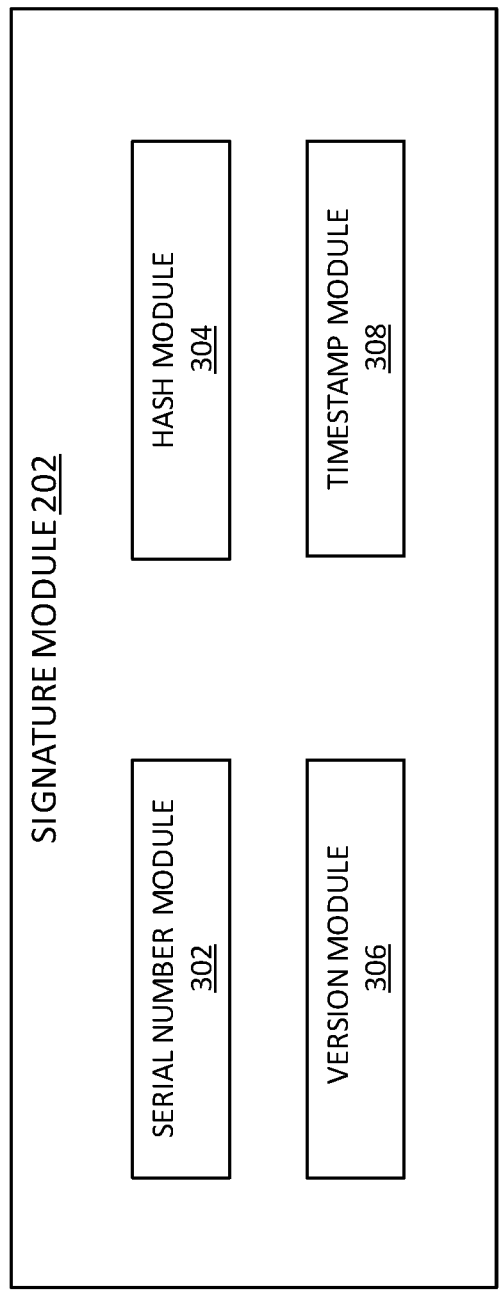
FIG. 3 is a schematic block diagram illustrating one embodiment of a signature module included in the manifest management module of FIG. 2.

A signature module 202 may include any suitable hardware and/or software than can include and/or manage one or more signatures for the hardware manifest 104. With reference to FIG. 3, FIG. 3 is a block diagram of one embodiment of a signature module 202. At least in the illustrated embodiment, the signature module 202 includes, among other components, a serial number module 302, a hash module 304, a version module 306, and a timestamp module 308.

A serial number module 302 may include any suitable hardware and/or software than can store, track, list, record, identify, and/or otherwise memorialize a serial number for the set of hardware components 102 included in the information handling device 100. In some embodiments, the serial number module 302 includes a listing of and/or tracks the serial number for all of the hardware components 102 included in the hardware manifest 104. In other embodiments, the serial number module 302 includes a listing of and/or tracks the serial number for a subset of the hardware components 102 included in the hardware manifest 104. In still other embodiments, the serial number module 302 includes a listing of and/or tracks the serial number for one or more of the hardware components 102 included in the hardware manifest 104. In yet other embodiments, the serial number module 302 includes a listing of and/or tracks the serial number for a single hardware component 102 included in the hardware manifest 104.

The serial number(s) can be utilized to determine whether one or more of the hardware components 102 included in the hardware manifest 104 is/are the same hardware components 102 included in the information handling device 100 at the time the information handling device 100 was manufactured and/or created (e.g., an original equipment manufacturer (OEM) component) or has been replaced. The determination can be made by comparing each serial number (e.g., the one or more serial numbers) in the hardware manifest 104 and the serial number(s) of each corresponding hardware component that is currently in the information handling device to determine a match. A match indicates that a particular hardware component 102 is an OEM component, whereas a non-match indicates that the particular hardware component 102 has been replaced and/or modified.

A hash module 304 may include any suitable hardware and/or software than can store, track, list, record, identify, and/or map a hash for the set of hardware components 102 included in the hardware manifest 104. The hash may include any suitable size and/or length that is known or developed in the future. In some embodiments, the hash includes a 256-byte hash, among other lengths and/or sizes that are greater than or less than 256 bytes that are possible and contemplated herein.

In some embodiments, the hash module 304 includes a map of and/or tracks the hash for all of the hardware components 102 included in the hardware manifest 104. In other embodiments, the hash module 304 includes a map of and/or tracks the hash for a subset of the hardware components 102 included in the hardware manifest 104. In still other embodiments, the hash module 304 includes a map of and/or tracks the hash for one or more of the hardware components 102 included in the hardware manifest 104. In yet other embodiments, the hash module 304 includes a map of and/or tracks the hash for a single hardware component 102 included in the hardware manifest 104.

In further embodiments, the hash module 304 may include any suitable hardware and/or software than can perform a hash function on the hashes or hash for the set of hardware components 102 to calculate a hash value for the hardware manifest 104. In some embodiments, the hash module 304 calculates a hash value for the hardware manifest 104 based on the hash for all of the hardware components 102 in the hardware manifest 104. In other embodiments, the hash module 304 calculates a hash value for the hardware manifest 104 based on the hash for a subset of the hardware components 102 in the hardware manifest 104. In still other embodiments, the hash module 304 calculates a hash value for the hardware manifest 104 based on the hash for one or more of the hardware components 102 in the hardware manifest 104.

In yet other embodiments, the hash module 304 calculates a hash value for the hardware manifest 104 based on the hash for a single hardware component 102 in the hardware manifest 104. In additional or alternative embodiments, the hash module 304 calculates a hash value for the hardware manifest 104 based on a plurality of single hashes for each hardware component 102 in the hardware manifest 104. In other additional or alternative embodiments, the hash module 304 calculates a hash value for the hardware manifest 104 based on all of the single hashes for each hardware component 102 in the hardware manifest 104.

The hash value(s) can be utilized to determine whether one or more of the hardware components 102 included in the hardware manifest 104 is/are an OEM component or has been replaced. The determination can be made by comparing the calculated hash value(s) the hash value(s) of the hardware manifest 104 at the time of manufacture of the information handling device 100 to determine a match. A match indicates that the one or more hardware components 102 is/are an OEM component, whereas a non-match indicates that one or more of the hardware component 102 has/have been replaced and/or modified.

A version module 306 may include any suitable hardware and/or software than can store, track, list, record, identify, and/or otherwise memorialize a version number (e.g., version 1.0, version 1.1, version 1.2, version 2.0, version 3.0, etc.) for the set of hardware components 102 included in the information handling device 100. In some embodiments, the version module 306 includes a listing of and/or tracks the version number for all of the hardware components 102 included in the hardware manifest 104. In other embodiments, the version module 306 includes a listing of and/or tracks the version number for a subset of the hardware components 102 included in the hardware manifest 104. In still other embodiments, the version module 306 includes a listing of and/or tracks the version number for one or more of the hardware components 102 included in the hardware manifest 104. In yet other embodiments, the version module 306 includes a listing of and/or tracks the version number for a single hardware component 102 included in the hardware manifest 104.

The version number(s) can be utilized to determine whether one or more of the hardware components 102 included in the hardware manifest 104 is/are an OEM component or has been replaced. The determination can be made by comparing each version number (e.g., the one or more version numbers) in the hardware manifest 104 and the version number(s) of each corresponding hardware component 102 that is currently in the information handling device 100 to determine a match. A match indicates that a particular hardware component 102 is an OEM component, whereas a non-match indicates that the particular hardware component 102 has been replaced and/or modified.

A timestamp module 308 may include any suitable hardware and/or software than can store, track, list, record, identify, and/or otherwise memorialize a timestamp for the set of hardware components 102 included in the information handling device 100. In some embodiments, the timestamp module 308 includes a listing of and/or tracks the time that each of the hardware components 102 was included in the hardware manifest 104. In other embodiments, the timestamp module 308 includes a listing of and/or tracks the time that each of a subset of the hardware components 102 was included in the hardware manifest 104. In still other embodiments, the timestamp module 308 includes a listing of and/or tracks the time that each of one or more of the hardware components 102 was/were included in the hardware manifest 104. In yet other embodiments, the timestamp module 308 includes a listing of and/or tracks the time that a single hardware component 102 was included in the hardware manifest 104. In additional or alternative embodiments, the timestamp module 308 includes a listing of and/or tracks the time that the hardware manifest 104 and/or information handling device 100 was completed and/or manufactured.

The time(s) can be utilized to determine whether one or more of the hardware components 102 included in the hardware manifest 104 is/are an OEM component or has been replaced. The determination can be made by comparing each time (e.g., the one or more times) in the hardware manifest 104 and the timestamp(s) of each corresponding hardware component 102 that is currently in the information handling device 100 to determine a match. In addition or in the alternative, the time(s) of completion and/or manufacture for the hardware manifest 104 and/or information handling device 100 can be utilized to determine whether one or more of the hardware components 102 included in the hardware manifest 104 is/are an OEM component or has been replaced. The determination can be made by comparing each time (e.g., the one or more times) in the hardware manifest 104 and the timestamp(s) of each corresponding hardware component 102 device 100 that is currently in the information handling device 100 to determine a match. A match indicates that a particular hardware component 102 is an OEM component, whereas a non-match indicates that the particular hardware component 102 has been replaced and/or modified.

The determination can be additionally or alternatively made by comparing the completion/manufacturing time(s) of the hardware manifest 104 and/or the information handling device 100 in the hardware manifest 104 and the timestamp(s) of the hardware manifest 104 and/or the information handling device 100, respectively, to determine a match. A match indicates that each hardware component 102 in the information handling device 100 is an OEM component, whereas a non-match indicates that one or more hardware components 102 in the information handling device 100 has been replaced and/or modified.

Figure 4:
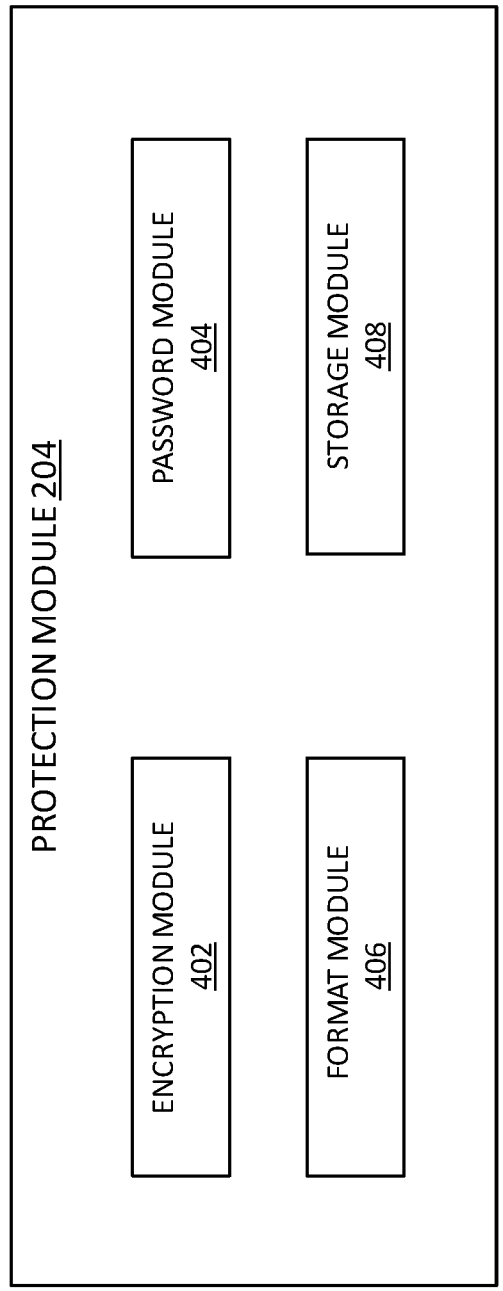
FIG. 4 is a schematic block diagram illustrating one embodiment of a protection module included in the manifest management module of FIG. 2.

A protection module 204 (see FIG. 2) may include any suitable hardware and/or software than can protect the hardware manifest 104 from being modified by an external entity (e.g., a human, user, and/or another computing device/system, etc.). With reference to FIG. 4, FIG. 4 is a block diagram of one embodiment of a protection module 204. At least in the illustrated embodiment, the protection module 204 includes, among other components, an encryption module 402, a password module 404, a format module 406, and a storage module 408.

An encryption module 402 may include any suitable hardware and/or software that can encrypt the hardware manifest 104 and/or the contents of the hardware manifest 104. The encryption module 402 can encrypt the hardware manifest 104 and/or the contents of the hardware manifest 104 utilizing any suitable encryption function, operations, and/or algorithm that is known or developed in the future.

The encryption module 402 may encrypt the hardware manifest 104 and/or the contents of the hardware manifest 104 with any suitable length encryption key. In various embodiments, the encryption module 402 encrypts the hardware manifest 104 and/or the contents of the hardware manifest 104 utilizing a key length of 128 bits, 192 bits, or 256 bits, among other key lengths that are possible and contemplated herein.

In some embodiments, the encryption module 402 encrypts the hardware manifest 104 and/or the contents of the hardware manifest 104 with a 128-bit Advanced Encryption Standard (AES) algorithm (AES-128). In additional or alternative embodiments, the encryption module 402 encrypts the hardware manifest 104 and/or the contents of the hardware manifest 104 with a 192-bit AES algorithm (AES-192). In further additional or alternative embodiments, the encryption module 402 encrypts the hardware manifest 104 and/or the contents of the hardware manifest 104 with a 256-bit AES algorithm (AES-256).

A password module 404 may include any suitable hardware and/or software that can store and/or use a password to password-protect the hardware manifest 104 and/or the contents of the hardware manifest 104. The password can include any suitable type of characters (e.g., alphanumeric and/or special characters, etc.) that is known or developed in the future.

The password may include any suitable length and/or combination of characters. In some embodiments, the password includes a predetermined range of character lengths. In additional or alternative embodiments, the password includes one or more predetermined attributes. For example, the predetermined attribute(s) may include, but is not limited to, one or more capital letters, one or more lower case letters, one or more capital numbers, and/or a combination of numbers, letters, and/or special characters, etc., among other attributes that are possible and contemplated herein.

In some embodiments, the password is a static password. In other embodiments, the password is a dynamic password A format module 406 may include any suitable hardware and/or software that can store the hardware manifest 104 and/or the contents of the hardware manifest 104 in a read-only format. The read-only format can include any suitable algorithm and/or language that is known or developed in the future that can prevent the hardware manifest 104 and/or the contents of the hardware manifest 104 from being modified.

A storage module 408 may include any suitable hardware and/or software that can store the hardware manifest 104 and/or the contents of the hardware manifest 104 to a read-only memory (ROM) device. The ROM device can include any suitable ROM device that is known or developed in the future that can prevent the hardware manifest 104 and/or the contents of the hardware manifest 104 from being modified when stored thereon.

In some embodiments, the ROM device includes at least a portion of the firmware for the information handling device 100. In additional or alternative embodiments, the ROM device may include a portion of a memory device (e.g., a flash memory device, etc.) that includes a read-only partition.

Figure 5:
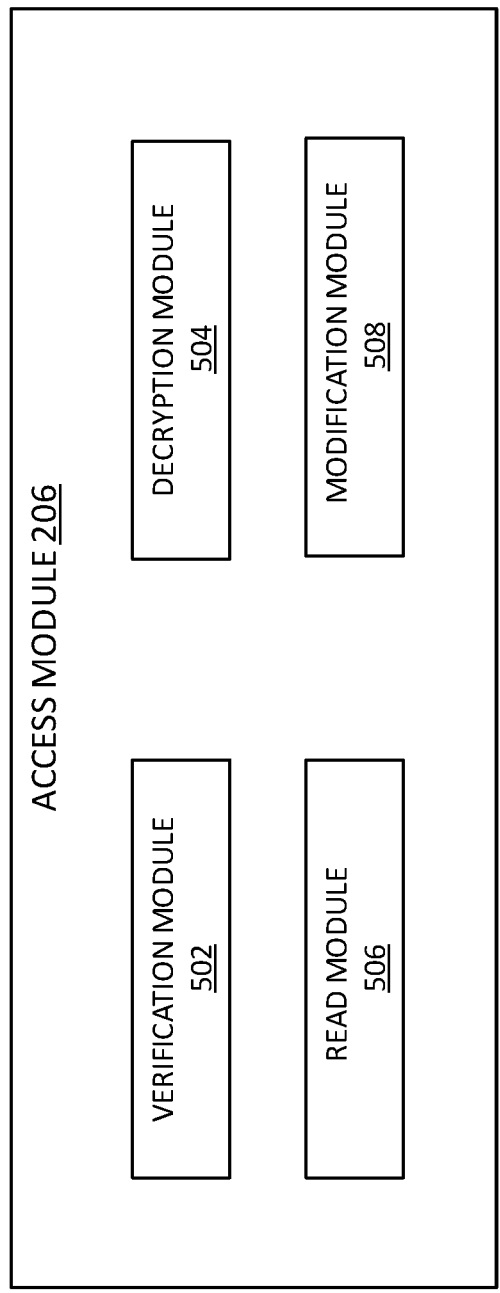
FIG. 5 is a schematic block diagram illustrating one embodiment of an access module included in the manifest management module of FIG. 2.

An access module 206 (see FIG. 2) may include any suitable hardware and/or software than can provide and/or permit access to the hardware manifest 104. With reference to FIG. 5, FIG. 5 is a block diagram of one embodiment of an access module 206. At least in the illustrated embodiment, the access module 206 includes, among other components, a verification module 502, a decryption module 504, a read module 506, and a modification module 508.

A verification module 502 may include any suitable hardware and/or software than can verify one or more access credentials. The access credential(s) may include any suitable type of credential that is known or developed in the future. In some embodiments, the access credential includes the password stored in the password module 404 of the protection module 204.

In some embodiments, the verification module 502 can provide a password prompt to a user attempting to access the hardware manifest 104 and receive a user input in response thereto. The verification module 502 can further compare user input to the password stored in the password module 404 to determine a match. The verification module 502 provides/permits access to the hardware manifest 104 in response to the user input matching the password stored in the password module 404 (e.g., a match) and denies access to the hardware manifest 104 in response to the user input not matching the password stored in the password module 404 (e.g., a non-match).

In additional or alternative embodiments, the verification module 502 can provide access (e.g., read access and/or write access, etc.) to a user in response to the user presenting a predetermined credential. A predetermined credential may include, but is not limited to, a security chip, a biometric match, and/or a manufacturer access code or credential, etc., among other credentials that are possible and contemplated herein.

In various embodiments, the verification module 502 can provide a user with read access and/or write access to the hardware manifest 104 depending upon the credentials and/or type of credentials provided by the user. In some embodiments, the verification module 502 can provide a user with only read access in response to the user providing a first credential (e.g., a password, etc.). In additional or alternative embodiments, the verification module 502 can provide a user with only write access in response to the user providing a second credential (e.g., a password, an access code, etc.). In further additional or alternative embodiments, the verification module 502 can provide a user with both read access and write access in response to the user providing a third credential (e.g., a password, an access code, a manufacturer credential, etc.).

In some embodiments, the verification module 502 notifies (e.g., transmits a notification and/or notice to) the decryption module 504 that a user has been provided read access and/or write access to the hardware manifest 104 in response to the user providing the proper password and/or access credentials. In additional or alternative embodiments, the verification module 502 notifies the read module 506 that a user has been provided read access to the hardware manifest 104 in response to the user providing the proper password and/or access credentials. In further additional or alternative embodiments, the verification module 502 notifies the modification module 508 that a user has been provided write access to the hardware manifest 104 in response to the user providing the proper password and/or access credentials. In still further additional or alternative embodiments, the verification module 502 notifies the read module 506 that a user has been provided read access to the hardware manifest 104 and also notifies the modification module 508 that a user has been provided write access to the hardware manifest 104 in response to the user providing the proper password and/or access credentials.

A decryption module 504 may include any suitable hardware and/or software than can decrypt a hardware manifest 104. In some embodiments, the decryption module 504 decrypts the hardware manifest 104 and/or the contents of the hardware manifest 104 in response to receiving the notification from the verification module 502 that a user is provided with access to the hardware manifest 104.

The decryption module 504 can include and/or perform any suitable decryption function, operations, and/or algorithm that correspond(s) to the encryption function, operations, and/or algorithm utilized by the encryption module 402 to encrypt the hardware manifest 104 and/or the contents of the hardware manifest 104. In various embodiments, the decryption module 504 includes the key to decrypt the hardware manifest 104 and/or the contents of the hardware manifest 104. In various embodiments, the decryption module 504 decrypts the hardware manifest 104 and/or the contents of the hardware manifest 104 utilizing a 128-bit key, a 192-bit key, or a 256-bit key, among other keys with different lengths that are possible and contemplated herein.

In some embodiments, the decryption module 504 decrypts the hardware manifest 104 and/or the contents of the hardware manifest 104 with an AES-128 key. In additional or alternative embodiments, the decryption module 504 decrypts the hardware manifest 104 and/or the contents of the hardware manifest 104 with an AES-192 key. In further additional or alternative embodiments, the decryption module 504 decrypts the hardware manifest 104 and/or the contents of the hardware manifest 104 with an AES-256 key.

A read module 506 may include any suitable hardware and/or software than can allow and/or enable a user to read a hardware manifest 104. In some embodiments, the read module 506 allows and/or enables the user to read the hardware manifest 104 and/or the contents of the hardware manifest 104 in response to receiving the notification from the verification module 502 that a user is provided with read access to the hardware manifest 104. Further, if encrypted, the user is provided with read access to the hardware manifest 104 subsequent to the decryption module 504 decrypting the hardware manifest 104 and/or the contents of the hardware manifest 104.

A modification module 508 may include any suitable hardware and/or software than can allow and/or enable a user to modify and/or write data to a hardware manifest 104. In some embodiments, the modification module 508 allows and/or enables the user to modify and/or write to the hardware manifest 104 and/or the contents of the hardware manifest 104 in response to receiving the notification from the verification module 502 that a user is provided with write access to the hardware manifest 104. Further, if encrypted, the user is provided with write access to the hardware manifest 104 subsequent to the decryption module 504 decrypting the hardware manifest 104 and/or the contents of the hardware manifest 104.

In various embodiments, the modification module 508 saves and/or stores the modification(s) and/or write(s) to the hardware manifest 104 at the location(s) where the hardware manifest is stored and/or resides. In further embodiments, the modification module 508 notifies a tracking module 208 that the hardware manifest 104 has been modified. In some embodiments, the modification module 508 notifies the tracking module 208 that the hardware manifest 104 has been modified each time the hardware manifest is written to and/or modified. In additional or alternative embodiments, the modification module 508 transmits the details of each modification and/or write to the tracking module 208 each time the hardware manifest is written to and/or modified.

Figure 6:
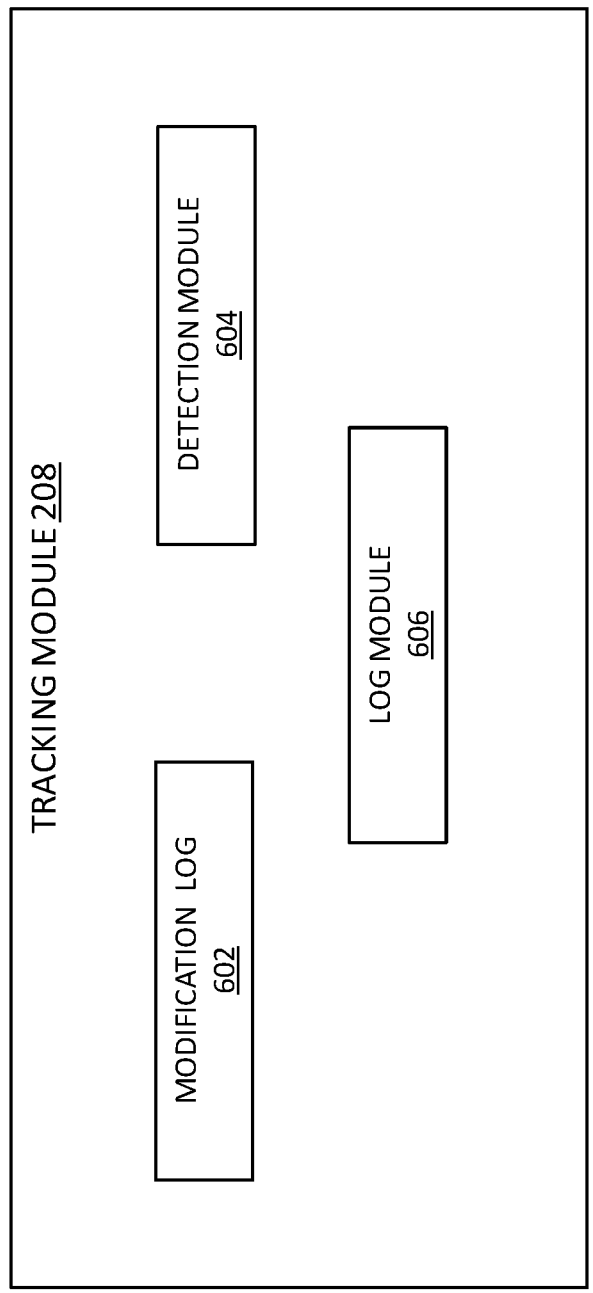
FIG. 6 is a schematic block diagram illustrating one embodiment of a tracking module included in the manifest management module of FIG. 2.

A tracking module 208 (see FIG. 2) may include any suitable hardware and/or software than can track the current state of the information handling device 100. With reference to FIG. 6, FIG. 6 is a block diagram of one embodiment of a tracking module 208. At least in the illustrated embodiment, the tracking module 208 includes, among other components, a modification log 602, a detection module 604, and a log module 606.

A modification log 602 may include any suitable hardware and/or software than can track and/or record modifications (e.g., replacements and/or repairs) made to the set of hardware components 102 in the information handling device 100. In some embodiments, the modification log 602 tracks and/or records each modification made to the one or more of the hardware components 102. In additional or alternative embodiments, the modification log 602 tracks and/or records the time (e.g., via a timestamp) that each modification to the hardware component(s) 102 occurs.

A detection module 604 may include any suitable hardware and/or software than can detect each modification made to the one or more of the hardware components 102 of the information handling device 100. In some embodiments, the detection module 604 detects each time that a hardware component 102 is replaced. In additional or alternative embodiments, the detection module 604 detects each time that a hardware component 102 is repaired.

In some embodiments, the detection module 604 notifies the log module 606 each time that the detection module 604 detects that a hardware component 102 is replaced. Here, the notification can include which hardware component(s) 102 was/were replaced and/or the time that each hardware component 102 was replaced.

In additional or alternative embodiments, the detection module 604 notifies the log module 606 each time that the detection module 604 detects that a hardware component 102 is repaired. Here, the notification can include which hardware component(s) 102 was/were repaired, the type of repair that occurred, and/or the time that each repair occurred.

A log module 606 may include any suitable hardware and/or software than can write, store, update, and/or record each modification made to the one or more of the hardware components 102 of the information handling device 100 in the modification log 602. In some embodiments, the log module 606 writes a modification to the modification log 602 in response to being notified by (e.g., receiving a notification from) the detection module 604 that the detection module 604 has detected that a hardware component 102 has been replaced. In additional or alternative embodiments, the log module 606 writes a modification to and/or updates the modification log 602 in response to being notified by the detection module 604 that the detection module 604 has detected that a hardware component 102 has been repaired.

In some embodiments, the log module 606 writes to and/or updates the modification log 602 each time that the detection module 604 detects that a hardware component 102 is replaced. Here, the write and/or update to the modification log 602 can include which hardware component(s) 102 was/were replaced and/or the time that each hardware component 102 was replaced.

In additional or alternative embodiments, the log module 606 write to and/or updates the modification log 602 each time that the detection module 604 detects that a hardware component 102 is repaired. Here, the write and/or update to the modification log 602 can include which hardware component(s) 102 was/were repaired, the type of repair that occurred, and/or the time that each repair occurred.

Figure 7A:
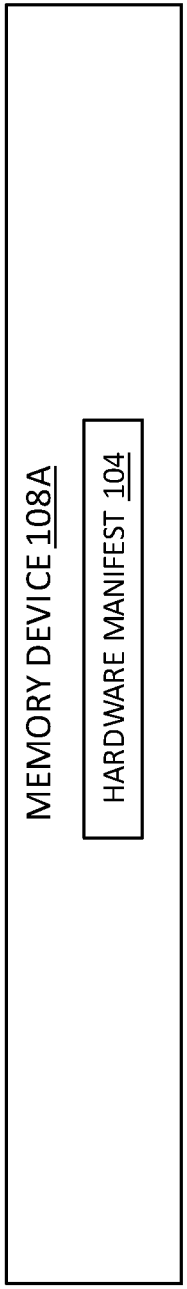
FIGS. 7A through 7C are schematic block diagrams illustrating various embodiments of a memory device included in the information handling device of FIG. 1.
Figure 7B:
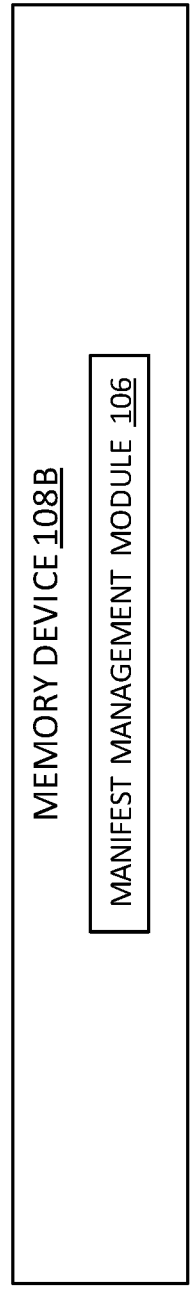
Figure 7C:
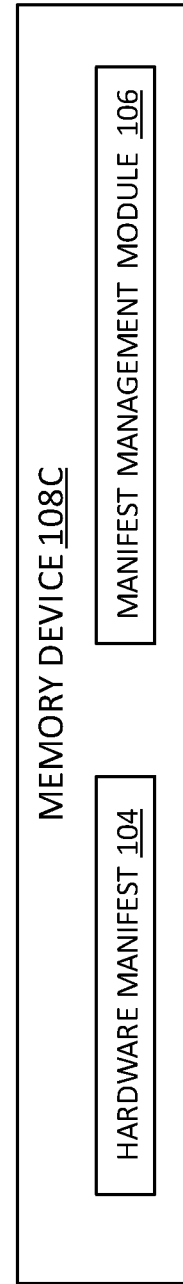

FIGS. 7A through 7C are schematic block diagrams illustrating various embodiments of a memory device 108A, 108B, and 108C (also simply referred individually, in various groups, or collectively as memory device(s) 108) included in the set of memory device 108 of the information handling device 100. A memory device 108 may include any suitable type of device and/or system that is known or developed in the future that can store computer-useable and/or computer-readable code. In various embodiments, a memory device 108 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In various embodiments, a memory device 108 includes volatile computer storage media. For example, a memory device 108 may include random access memory (RAM), including dynamic RAM (DRAM), synchronous dynamic RAM (SDRAM), and/or static RAM (SRAM). In some embodiments, a memory device 108 includes non-volatile computer storage media. For example, a memory device 108 may include a hard disk drive, a flash memory, and/or any other suitable non-volatile computer storage device that is known or developed in the future. In some embodiments, a memory device 108 includes both volatile and non-volatile computer storage media. In some embodiments, a memory device 108 also stores program code and/or related data, such as an operating system (OS) and/or other controller algorithms operating on an information handling device 100.

At least in the embodiment illustrated in FIG. 7A, the memory device 108A stores, among other data, a hardware manifest 104 that is similar to the hardware manifest 104 discussed elsewhere herein. The hardware manifest 104 stored in the memory device 108A can be in addition to the hardware manifest 104 in the information handling device 100 (e.g., a copy of the hardware manifest 104) or in lieu of the hardware manifest 104 in the information handling device 100.

In the embodiment illustrated in FIG. 7B, the memory device 108B stores, among other data, a manifest management module 106 that is similar to the manifest management module 106 discussed elsewhere herein. The manifest management module 106 stored in the memory device 108B can be in addition to the manifest management module 106 in the information handling device 100 (e.g., a copy of the manifest management module 106) or in lieu of the manifest management module 106 in the information handling device 100.

At least in the embodiment illustrated in FIG. 7C, the memory device 108C stores, among other data, a hardware manifest 104 and a manifest management module 106 that are similar to the hardware manifest 104 and the manifest management module 106 discussed elsewhere herein. The hardware manifest 104 and the manifest management module 106 stored in the memory device 108C can be in addition to the hardware manifest 104 in the information handling device 100 (e.g., a copy of the hardware manifest 104 and the manifest management module 106) or in lieu of the hardware manifest 104 and the manifest management module 106 in the information handling device 100.

Figure 8A:
FIGS. 8A through 8C are schematic block diagrams illustrating various embodiments of a processor included in the information handling device of FIG. 1.
Figure 8B:
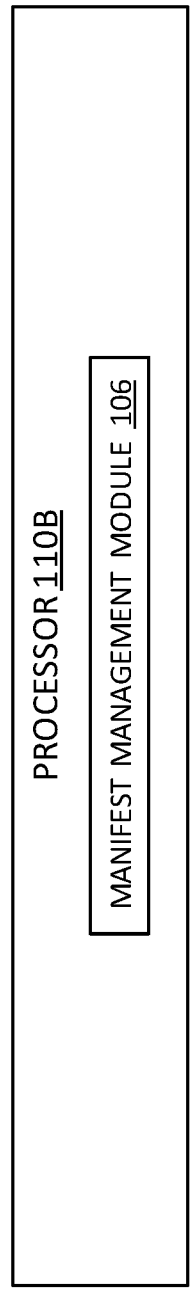
Figure 8C:
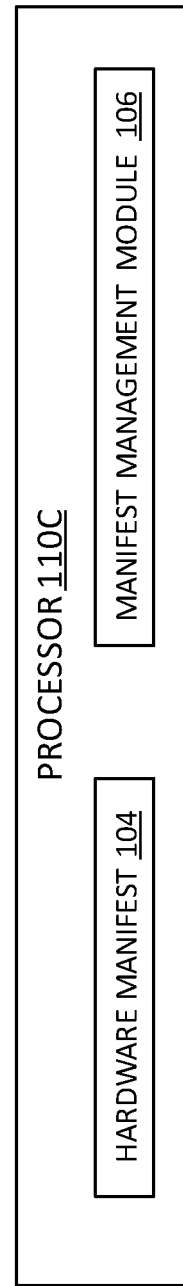

FIGS. 8A through 8C are schematic block diagrams illustrating various embodiments of a processor 110A, 110B, and 110C (also simply referred individually, in various groups, or collectively as processor(s) 110) included in the information handling device 100. A processor 110 may include any suitable hardware and/or software that is known or developed in the future capable of executing code in a manifest management module 106.

In various embodiments, a processor 110 includes and/or forms at least a portion of a controller capable of executing computer-readable instructions and/or capable of performing logical operations. For example, the processor 110 may be a microcontroller, a microprocessor, a central processing unit (CPU), a graphics processing unit (GPU), an auxiliary processing unit, and/or a field programmable gate array (FPGA), etc., among other programmable controllers that are possible and contemplated herein. In some embodiments, the processor 110 includes firmware, hardware, and/or software that executes instructions in the code stored in the memory device(s) 108, information handling device 100, and/or processor 110 to perform the functions, operations, methods, and/or routines of the object transfer module(s) 106 included therein.

At least in the embodiment illustrated in FIG. 8A, the processor 110A stores, among other data, a hardware manifest 104 that is similar to the hardware manifest 104 discussed elsewhere herein. The hardware manifest 104 stored in the memory device 108A can be in addition to the hardware manifest 104 in the memory device(s) 108 and/or the information handling device 100 (e.g., a copy of the hardware manifest 104) or in lieu of the hardware manifest 104 in the memory device(s) 108 and the information handling device 100.

In the embodiment illustrated in FIG. 8B, the processor 110B stores, among other data, a manifest management module 106 that is similar to the manifest management module 106 discussed elsewhere herein. The manifest management module 106 stored in the processor 110B can be in addition to the manifest management module 106 in the memory device(s) 108 and/or the information handling device 100 (e.g., a copy of the manifest management module 106) or in lieu of the manifest management module 106 in the memory device(s) 108 and the information handling device 100.

At least in the embodiment illustrated in FIG. 8C, the processor 110C stores, among other data, a hardware manifest 104 and a manifest management module 106 that are similar to the hardware manifest 104 and the manifest management module 106 discussed elsewhere herein. The hardware manifest 104 and the manifest management module 106 stored in the processor 110C can be in addition to the hardware manifest 104 in the memory device(s) 108 and/or the information handling device 100 (e.g., a copy of the hardware manifest 104 and the manifest management module 106) or in lieu of the hardware manifest 104 and the manifest management module 106 in the memory device(s) 108 and the information handling device 100.

Figure 9:
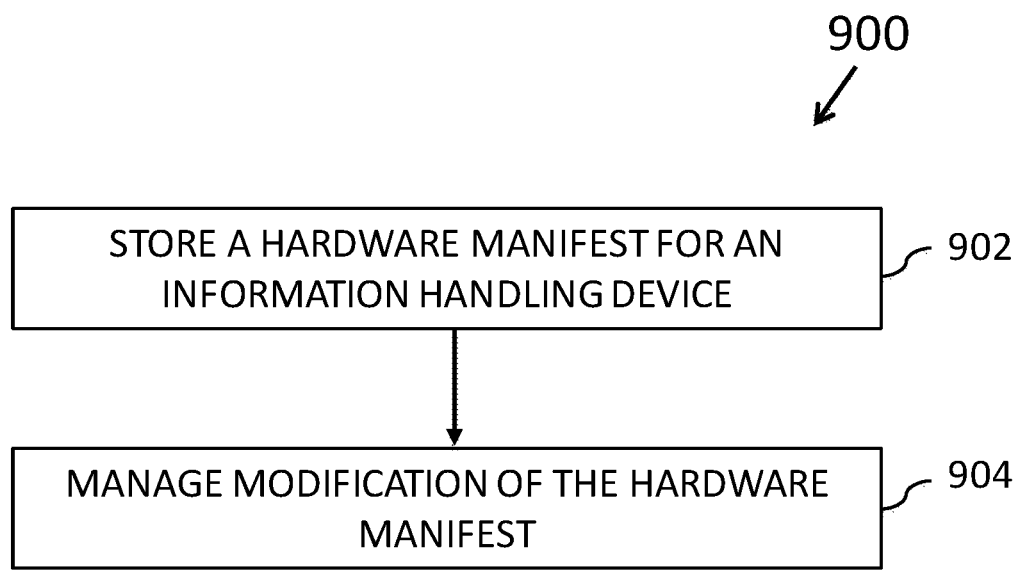
FIG. 9 is a schematic flow chart diagram illustrating one embodiment of a method for storing a hardware manifest.

FIG. 9 is a schematic flow chart diagram illustrating one embodiment of a method 900 for storing a hardware manifest. In some embodiments, the method 900 is performed by an apparatus, such as an information handling device 100. In other embodiments, the method 900 may be performed by one or more modules, such as the manifest management module(s) 106 and/or one or more modules included therein. In certain embodiments, the method 900 may be performed by a processor 110 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 900 begins by storing a hardware manifest 104 for an information handling device 100 (block 902). The hardware manifest 104 can be any of the embodiments of a hardware manifest 104 discussed elsewhere herein.

The method further includes managing modification of the hardware manifest 104 (block 904). In some embodiments, managing modification of the hardware manifest 104 includes encrypting the hardware manifest 104. The hardware manifest 104 may be encrypted using any of the techniques and/or algorithms discussed elsewhere herein. In additional or alternative embodiments, managing modification of the hardware manifest 104 includes password-protecting the hardware manifest 104. The hardware manifest 104 may be password-protected using any of the techniques and/or algorithms discussed elsewhere herein.

In further additional or alternative embodiments, managing modification of the hardware manifest 104 includes storing the hardware manifest 104 in a read only format. The read-only format may include any of the read-only formats discussed elsewhere herein. In still further additional or alternative embodiments, managing modification of the hardware manifest 104 includes storing the hardware manifest 104 on a read-only memory device. The read-only memory device may include any of the read-only memory devices discussed elsewhere herein.

In yet further additional or alternative embodiments, managing modification of the hardware manifest 104 includes updating the hardware manifest 104 each time each hardware component 102 in the set of hardware components 102 is modified. In some embodiments, modifying a hardware component 102 in the set of hardware components 102 includes replacing the hardware component 102. In additional or alternative embodiments, modifying the hardware component 102 includes repairing the hardware component 102.

In other additional or alternative embodiments, managing modification of the hardware manifest 104 includes maintaining a modification log 602. In further additional or alternative embodiments, updating the hardware manifest 104 includes tracking, in the modification log 602, each time each hardware component 102 is modified.

Figure 10:
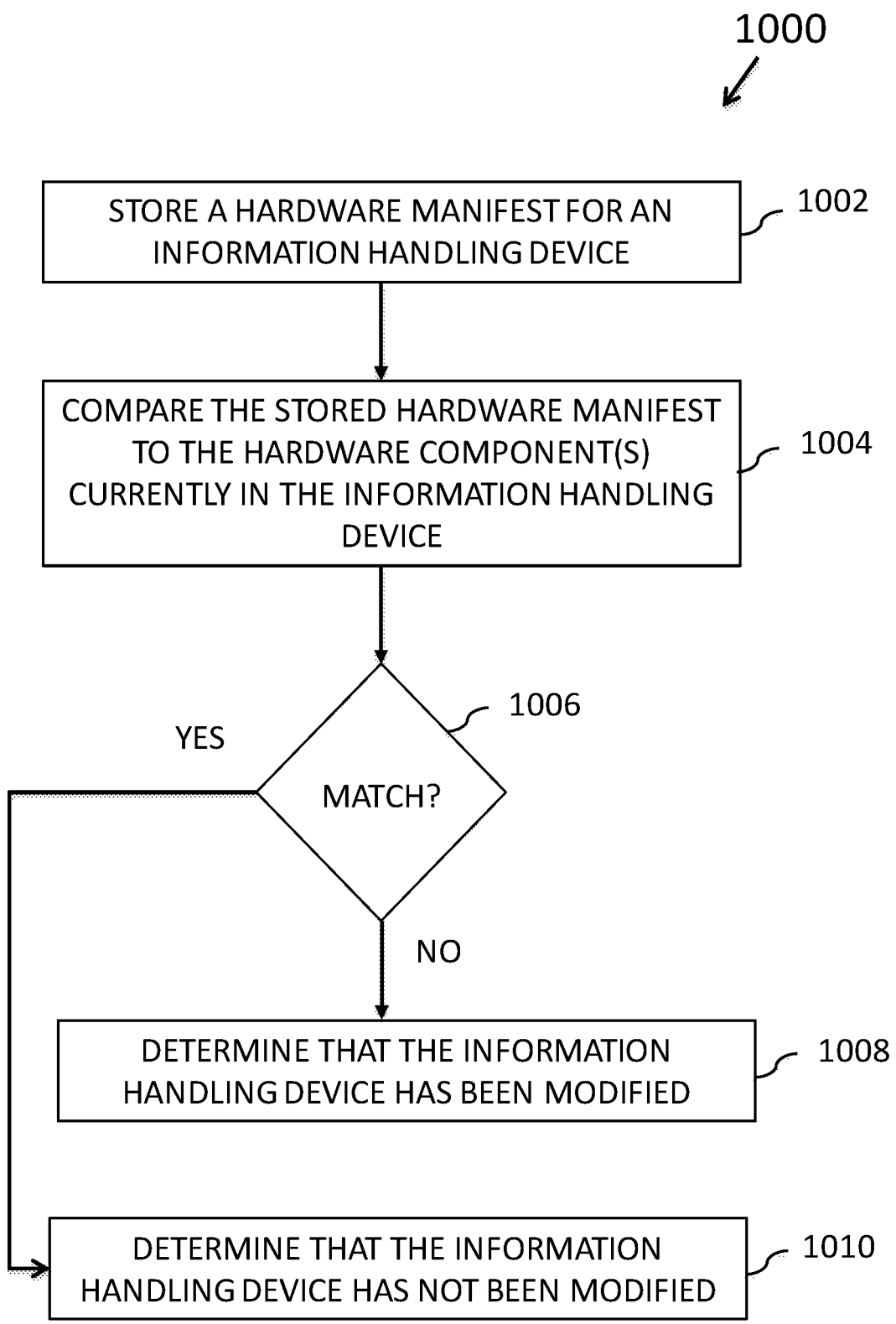
FIG. 10 is a schematic flow chart diagram illustrating another embodiment of a method for using a hardware manifest.

FIG. 10 is a schematic flow chart diagram illustrating one embodiment of a method 1000 for using a hardware manifest 104. In some embodiments, the method 1000 is performed by an apparatus, such as an information handling device 100. In other embodiments, the method 1000 may be performed by one or more modules, such as the manifest management module(s) 106 and/or one or more modules included therein. In certain embodiments, the method 1000 may be performed by a processor 110 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 1000 begins by storing a hardware manifest 104 for an information handling device 100 (block 1002). The hardware manifest 104 can be any of the embodiments of a hardware manifest 104 discussed elsewhere herein.

The method 100 further includes comparing the stored hardware manifest 104 to the hardware component(s) 102 currently included in the information handling device 100 (block 1004) to determine a match (block 1006). In some embodiments, a hash value for the hardware manifest 104 is compared to the hash value for the hardware component(s) 102 currently included in the information handling device 100. The hash value(s) may be calculated using any of the techniques and/or algorithms discussed elsewhere herein.

In additional or alternative embodiments, the serial number(s) for one or more hardware components 102 stored in the hardware manifest 104 is compared to the serial number(s) for the hardware component(s) 102 currently included in the information handling device 100. The serial number(s) may be any one or more serial numbers discussed elsewhere herein.

In further additional or alternative embodiments, the version number(s) for one or more hardware components 102 stored in the hardware manifest 104 is compared to the version number(s) for the hardware component(s) 102 currently included in the information handling device 100. The version number(s) may be any one or more version numbers discussed elsewhere herein.

In still further additional or alternative embodiments, the timestamp for one or more hardware components 102 stored in the hardware manifest 104 is compared to the time(s) that hardware component(s) 102 currently included in the information handling device 100 was added to the information handling device 100. The timestamp(s) may be any type of timestamp and/or time discussed elsewhere herein.

In response to the hardware manifest not matching the hardware component(s) 102 currently included in the information handling device 100 (e.g., a "NO" in block 1004), it is determined that the information handling device 100 has been modified since the time of manufacture (block 1008). In some embodiments, determining that the information handling device 100 has been modified since the time of manufacture includes determining that the information handling device 100 is no longer its original condition and/or includes one or more non-OEM hardware components 102.

In response to the hardware manifest matching the hardware component(s) 102 currently included in the information handling device 100 (e.g., a "YES" in block 1004), it is determined that the information handling device 100 has not been modified since the time of manufacture (block 1010). In some embodiments, determining that the information handling device 100 has not been modified since the time of manufacture includes determining that the information handling device 100 is in its original condition and/or includes OEM hardware components 102.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor of an information handling device; and
a memory that stores code executable by the processor to:
store a hardware manifest for the information handling device, and
manage modification of the hardware manifest,
wherein managing modification of the hardware manifest comprises protecting the hardware manifest from modification by an external entity.

2. The apparatus of claim 1, wherein:
the information handling device comprises a set of hardware; and
the hardware manifest includes a unique signature for at least one piece of hardware in the set of hardware.

3. The apparatus of claim 2, wherein the unique signature comprises one of a serial number, a firmware hash, and a version identifier.

4. The apparatus of claim 1, wherein the hardware manifest comprises a timestamp including a date of manufacture for the information handling device.

5. The apparatus of claim 1, wherein protecting the hardware manifest from modification comprises one of encrypting the hardware manifest and password-protecting the hardware manifest.

6. The apparatus of claim 1, wherein one of:
the hardware manifest is written in a read only format; and
the memory is a read-only memory device.

7. The apparatus of claim 1, wherein:
the information handling device comprises a set of hardware; and
managing modification of the hardware manifest comprises updating the hardware manifest each time each piece of hardware in the set of hardware is modified.

8. The apparatus of claim 7, wherein modification of a piece of hardware in the set of hardware includes replacing the piece of hardware.

9. The apparatus of claim 8, wherein:
modification of the piece of hardware further comprises repairing the piece of hardware;
managing modification of the hardware manifest comprises maintaining a log; and
the code is further executable to track, in the log, each time each piece of hardware is modified.

10. The apparatus of claim 1, wherein protecting the hardware manifest from modification comprises encrypting the hardware manifest.

11. A method, comprising:
storing, by a processor, a hardware manifest for an information handling device; and
managing modification of the hardware manifest, wherein managing modification of the hardware manifest comprises protecting the hardware manifest from modification by an external entity.

12. The method of claim 11, wherein managing modification of the hardware manifest comprises one of:
encrypting the hardware manifest; and
password-protecting the hardware manifest.

13. The method of claim 11, wherein managing modification of the hardware manifest comprises one of:
storing the hardware manifest in a read only format; and
storing the hardware manifest on a read-only memory device.

14. The method of claim 11, wherein:
the information handling device comprises a set of hardware; and
managing modification of the hardware manifest comprises updating the hardware manifest each time each piece of hardware in the set of hardware is modified.

15. The method of claim 14, wherein:
modification of a piece of hardware in the set of hardware includes at least one of replacing the piece of hardware and repairing the piece of hardware;
managing modification of the hardware manifest comprises maintaining a log; and
updating the hardware manifest comprises tracking, in the log, each time each piece of hardware is modified.

16. A program product comprising a non-transitory computer-readable storage medium that stores code executable by a processor, the executable code comprising code to perform:
storing a hardware manifest for an information handling device; and
managing modification of the hardware manifest, wherein managing modification of the hardware manifest comprises protecting the hardware manifest from modification by an external entity.

17. The program product of claim 16, wherein the code to perform managing modification of the hardware manifest comprises one of:
code to perform encrypting the hardware manifest; and
code to perform password-protecting the hardware manifest.

18. The program product of claim 16, wherein the code to perform managing modification of the hardware manifest comprises one of:
code to perform storing the hardware manifest in a read only format; and
code to perform storing the hardware manifest on a read-only memory device.

19. The program product of claim 16, wherein:
the information handling device comprises a set of hardware; and
the code to perform managing modification of the hardware manifest comprises code to perform updating the hardware manifest each time each piece of hardware in the set of hardware is modified.

20. The program product of claim 19, wherein:
modification of a piece of hardware in the set of hardware includes at least one of replacing the piece of hardware and repairing the piece of hardware;
the code to perform managing modification of the hardware manifest comprises code to perform maintaining a log; and
the code to perform updating the hardware manifest comprises code to perform tracking, in the log, each time each piece of hardware is modified.

* * * * *